US012806868B2

(12) United States Patent
Joergensen et al.

(10) Patent No.: US 12,806,868 B2
(45) Date of Patent: Nov. 24, 2026

(54) METHOD FOR MANUFACTURING A PREFORM BUILDING ELEMENT AND MOLD ARRANGEMENT

(71) Applicant: Siemens Gamesa Renewable Energy A/S, Brande (DK)

(72) Inventors: Jens Grandjean Joergensen, Aalborg (DK); Anette Struve Nielsen, Galten (DK); Mogens Nielsen, Aalborg (DK); Harald Stecher, Skørping (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 66 days.

(21) Appl. No.: 18/853,207

(22) PCT Filed: Feb. 28, 2023

(86) PCT No.: PCT/EP2023/054979
§ 371 (c)(1),
(2) Date: Oct. 1, 2024

(87) PCT Pub. No.: WO2023/193994
PCT Pub. Date: Oct. 12, 2023

(65) Prior Publication Data

US 2025/0214310 A1 Jul. 3, 2025

(30) Foreign Application Priority Data

Apr. 7, 2022 (EP) .................................... 22167133

(51) Int. Cl.
*B29C 70/54* (2006.01)
*B29B 11/16* (2006.01)
(Continued)

(52) U.S. Cl.
CPC ............ *B29C 70/541* (2013.01); *B29B 11/16* (2013.01); *B29C 70/388* (2013.01); *B29L 2031/085* (2013.01)

(58) Field of Classification Search
None
See application file for complete search history.

(56) References Cited

U.S. PATENT DOCUMENTS 5,352,306 A 10/1994 Grimshaw et al.
8,343,410 B2 1/2013 Herbeck et al.
(Continued)

FOREIGN PATENT DOCUMENTS

CN 101636258 A 1/2010
CN 104837610 A 8/2015
(Continued)

OTHER PUBLICATIONS

Reply to EU Communication, Application EU23706814.3, Mar. 6, 2025.*

(Continued)

*Primary Examiner* — Yung-Sheng M Tsui
(74) *Attorney, Agent, or Firm* — Schmeiser Olsen LLC

(57) ABSTRACT

A method for manufacturing a preform building element used for building a wind turbine rotor blade, that is manufactured from one or more fiber mat components and at least one further component arranged on a molding surface of a mold, wherein one or more fiber mat components are arranged one after the other on the further component and/or on previously arranged fiber mat components, wherein the fiber mat component is laid out at least sectionally on the respective directly subjacent component with a moving boundary of a contact area, at which the laid out fiber mat comes into contact with the subjacent component, during laying out of the or each fiber mat component, a binding
(Continued)

Figure 1:
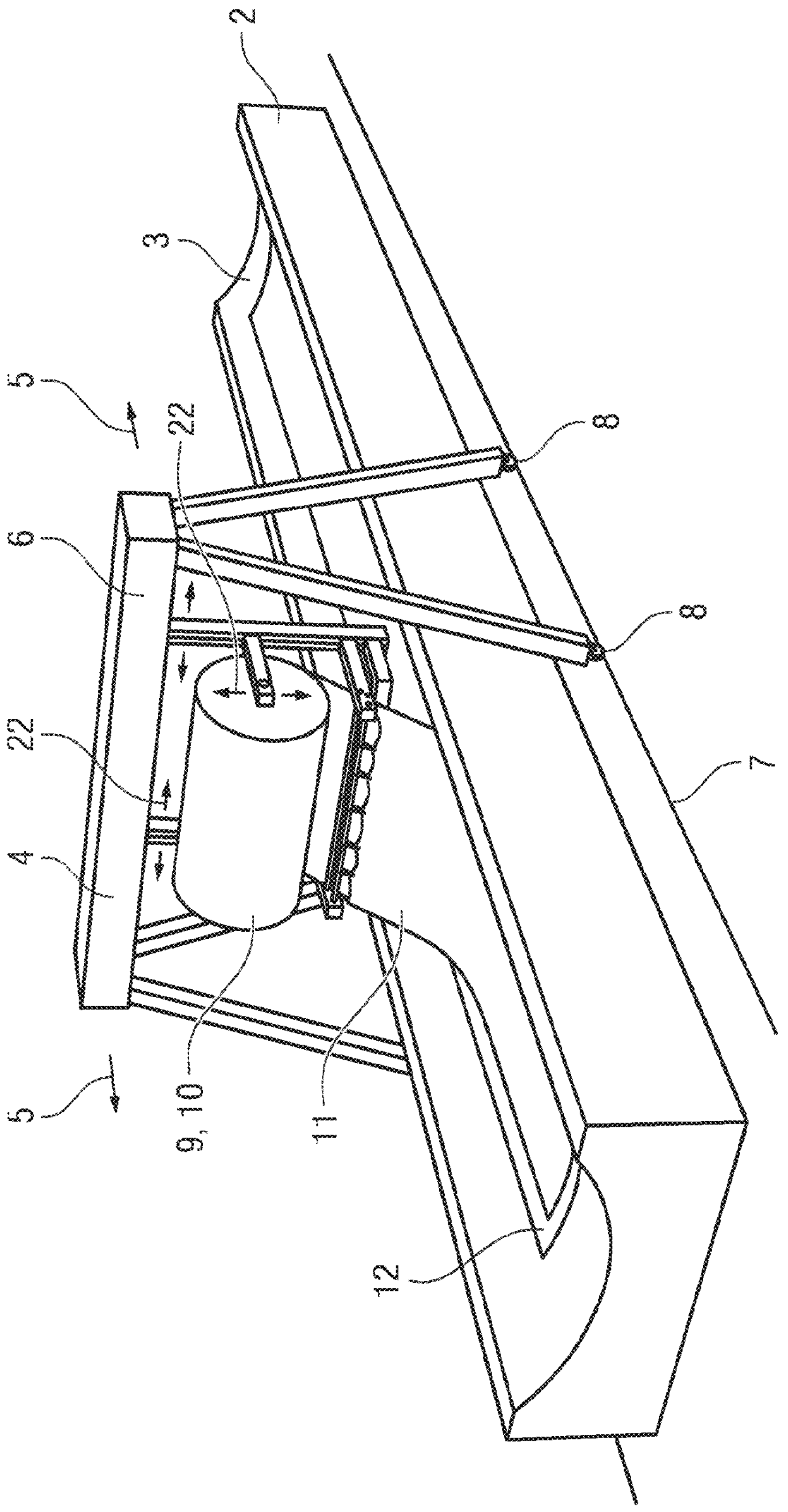

agent is applied at least sectionally to the boundary and/or a binding agent supplied in the laid-out fiber mat component and/or in the subjacent component is activated at least sectionally at and/or behind the boundary.

12 Claims, 6 Drawing Sheets

(51) Int. Cl.
*B29C 70/38* (2006.01)
*B29L 31/08* (2006.01)

(56) References Cited

U.S. PATENT DOCUMENTS

| | | | | |
|---|---|---|---|---|
| 2005/0067731 | A1 | 3/2005 | Bruyere | |
| 2009/0311506 | A1 | 12/2009 | Herbeck et al. | |
| 2011/0011537 | A1 | 1/2011 | Hamlyn et al. | |
| 2015/0273771 | A1* | 10/2015 | Schreiber | B29C 70/386 156/578 |
| 2016/0354984 | A1 | 12/2016 | Hedges et al. | |
| 2017/0095985 | A1* | 4/2017 | Engel | B29C 66/45 |

FOREIGN PATENT DOCUMENTS

| | | | |
|---|---|---|---|
| DE | 10 2019 106629 | A1 | 9/2020 |
| EP | 2 903 805 | A1 | 8/2015 |
| TW | 201805101 | A | 2/2018 |

OTHER PUBLICATIONS

International Search Report for PCT/EP2023/054979, mailed on May 22, 2023.

* cited by examiner

METHOD FOR MANUFACTURING A PREFORM BUILDING ELEMENT AND MOLD ARRANGEMENT

CROSS-REFERENCE TO RELATED APPLICATIONS

This application is a national stage of PCT Application No. PCT/EP2023/054979, having a filing date of Feb. 28, 2023, which claims priority to EP Application No. 22167133.2, having a filing date of Apr. 7, 2022, the entire contents both of which are hereby incorporated by reference.

FIELD OF TECHNOLOGY

The following relates to a method for manufacturing a preform building element used for building a wind turbine rotor blade, wherein the preform building element is manufactured from one or more fiber mat components and at least one further component. Furthermore, the following relates to a mold arrangement for manufacturing a preform building element.

BACKGROUND

Preform building elements may be used to facilitate the manufacture of wind turbine rotor blades. Each preform building element is made from one or more components, which are at least sectionally attached to each other. Compared to arranging each of these components on their own, the usage of preform building elements comprising a plurality of attached components facilitates the handling and enables a simultaneous arrangement of the components, so that the mold packing process of the wind turbine rotor blade mold can be significantly accelerated. Furthermore, also a correct arrangement of the components is facilitated since the components forming the preform building element are already locally adhered maintaining a predetermined shape and their desired relative orientation.

Generally, for fabricating a preform building element, a preform mold comprising a molding surface is used. The molding surface defines the shape of the preform building element to be manufactured, hence the shape, in which different components forming the preform building elements are attached to each other. For manufacturing a preform building element, for example, the molding surface may be cleaned and the components used for manufacturing the preform building element are arranged in the mold. The components may comprise one or more layer of a fiber-based material, for instance glass fiber mats or the like, and optionally one or more elements of a core material like balsa wood or a foam material, if required.

The components of the preform building element are locally attached to each other using a binder. The binder may be for instance a liquid or solid binder which is pre-impregnated in the fiber mats, or which is distributed between two adjacently arranged components and/or layers of the preform building element. The adhesive abilities of the binder may be in particular heat-activatable so that the preform building element can be consolidated after the arrangement has finished. It is possible that the components in the mold are shielded with a vacuum film, to which a vacuum is applied, so that the components are fixated relative to each other.

When the vacuum has been established, for instance a heating cover, a heating lid and/or heating blankets may be arranged on the top surface of the components in the mold for thermal activation of the binder. The heating of the adhesive may occur for instance also by using an oven or an autoclave for activation. In addition or alternatively, the stack of components may be heated from below by using heating means like heating blankets placed below the components and/or by using a mold with a heating system for heating the molding surface. Also, combinations of a heated mold to allow for heating from below and a heating blanket to allow for heating from above or the like are possible.

Afterwards, heat is supplied, for instance from hot air in the cover and/or by heating pipes below the molding surface. The temperature is increased to the temperature, which is required for the activation of the binder. For instance, to activate a powder binder, a temperature between 80° and 90° may be required. The activation temperature is kept for the required time to activate the binder. Depending on the thickness of the stack of components, the duration of heating can be the most time-consuming part of the manufacturing process, since the heating duration can easily take 2.5 to 3 hours in order to reach the activation temperature also in the core of the stack.

After heating, the heating cover may be removed from the mold and the preform building element may remain in the mold until it has a temperature that is low enough for the fabricated preform building element to be handled, hence until the binder has hardened sufficiently to allow for transporting the preform building element without the risk of damaging it. The cooled preform building element may then be released from the vacuum film and lifted off from the molding surface. The manufactured preform building element may be placed in a rack on corresponding supports that help to hold the geometry of the preform building element as fabricated while being stored and/or transported. The preform building element may then be carefully transported to a wind turbine rotor blade mold, where it is lifted up and placed in the blade mold for manufacturing of the wind turbine rotor blade.

For the preform building elements, the heating of the binder is the most time-consuming part of the manufacturing process. In addition, due to the large heating durations, the outer sections of the stack of components are heated for a longer time compared to the components at the core of the stack, since the heat is normally applied from the molding surface and/or from a heating means arranged on top of the stacked components. This has the disadvantage that the adhesive may begin to be drawn into textile components arranged at the lower or upper surface of the preform building element due to capillary forces when they are heated for too long. However, it is necessary to have the core of the stack of components to reach the temperature required for the activation of the binder, which is only obtainable by heating for a sufficiently long time.

Since the different layers forming the preform building element are all attached by the activatable binder, with increasing thickness of the preform building element to be fabricated, the time required for heating the binder, in particular in the core region of the preform building element to be fabricated, increases. Generally, the activation time for thermal activation of the binder scales quadratic with the thickness of the preform building element to be fabricated. Consequently, a doubling of the preform element thickness would lead to an increase of the heating time by a factor of four. Hence, the thicker the preform building elements to be fabricated become, the more significant becomes the unwanted capillary diffusion of the binder close to the surfaces of the stack. Consequently, there is the need for a method for manufacturing preform building elements that facilitates the adhesion of components, in particular for thicker components and/or for thicker stacks of components used for forming the preform building element.

SUMMARY

An aspect relates to an improved method for manufacturing a preform building element, which in particular improves the binder activation during the manufacture of thick preform building elements by avoiding unwanted diffusion of the binder at least partly.

According to embodiments of the invention, this aspect is solved by a method as initially described, wherein the further component is arranged on a molding surface of a mold, wherein one or more fiber mat components are arranged one after the other on the further component and/or on previously arranged fiber mat components, wherein the or each fiber mat component is laid out at least sectionally on the respective directly subjacent component with a moving boundary of a contact area, at which the laid-out fiber mat comes into contact with the subjacent component, wherein during laying out of the or each fiber mat component,

- a binding agent is applied at least sectionally to the boundary and/or
- a binding agent supplied in the laid-out fiber mat component and/or in the subjacent component is activated at least sectionally at and/or behind the boundary, wherein the applied binding agent and/or the activated supplied binding agent adheres the laid-out fiber mat component to the subjacent component.

The preform building element is manufactured from one or more fiber mat components and one further component using the mold. The further component is the first component, which is arranged on the molding surface of the mold. The further component may also be a fiber mat or a different type of component. Afterwards, the one or more fiber components are arranged one after the other onto the further component, or onto previously arranged fiber mat components, respectively.

For arrangement in the mold, the fiber mat components are laid out in such manner that a contact area with a moving boundary is created. This may occur for instance by bringing the fiber mat component into contact with the respective subjacent component, wherein the fiber mat component is then laid out along the subjacent component. The boundary, at which the upper fiber mat component to be laid out comes into contact with the underlying, subjacent component, will then move along the subjacent component, or the laid-out fiber mat component, respectively, until the fiber mat component has been laid out completely on the subjacent component.

For the first fiber mat, which is laid into the mold, the further component initially arranged in the mold is the respective subjacent component. For the further fiber mat components arranged in the mold, the respective subjacent component may be in particular a previously laid-out fiber mat component. It is possible that the further component and/or the fiber mat components have varying sizes, so that a laid-out fiber mat component may be in contact with one or more different subjacent components, or previously arranged, underlying components, respectively.

The laying out of the fiber mat component with the moving boundary may occur for instance by unrolling, unspooling or continuously unfolding the fiber mat component to be laid out along a top surface of the respective subjacent component. Hence the fiber mat component is deposited continuously or step-by-step along the at least one subjacent component. Thereby, the contact area increases and depending on the direction of laying out, or the unrolling, unspooling, or unfolding, respectively, the boundary moves along the underlying component.

To allow for adherence of the components forming the preform building element, during the laying out of the fiber mat components, a binding agent is applied at least sectionally to the moving boundary and/or a binding agent, which is already supplied in the laid-out fiber mat component and/or in the previously arranged, subjacent component, is activated at least sectionally at and/or behind the moving boundary. In this respect, the term "behind" refers to the movement direction of the boundary, so that a binding agent, which is activated behind the boundary, is activated in a section, in which the fiber mat component to be laid out has already been arranged on the underlying component.

The binding agent, which may also be denoted as binder, tackifier or adhesive, is used for locally adhering the further component and/or the one or more fiber mat components. By using this binding agent, only local attachment sections, for instance attachment points or lines, between the components are created, so that the preform building element may be used afterwards in a resin infusion-based rotor blade casting process.

The localized attachment between adjacent components by the binding agent enables the fiber mat components to be soaked by the liquid resin. The binding agent is in particular an activatable adhesive, whose adhesive abilities are activatable by heat, chemical activation agent the like. This facilitates the arrangement of the components, since the adhesive ability of the binding agent can be activated when needed.

The fiber mat components may be mats or plies of a fiber-based material like glass fibers, carbon fibers, aramid fibers or the like. Depending on the shape of the preform building element to be manufactured, different geometries of the fiber mat components are possible. In embodiments, the fiber mat component can have a rectangular or an essentially rectangular shape. However, also other shapes of the fiber mat components are possible.

The laying out of the fiber mat components one after the other has the advantage that the fiber mat components may be adhered individually to the one or more subjacent components using the binding agent. This has the effect that the required heating time only scales linearly with the number of fiber mat components, or with the thickness of the preform building elements to be fabricated, respectively.

In addition, by individually adhering the fiber mat components to the underlying components, the need for long heating times to reach sufficient core temperatures for activation of the binding agent is omitted. In embodiments, for the manufacture of thick preform building elements, the process time can be reduced due to shorter heating durations. In embodiments, an overheating in the outer layers of the fiber material can be avoided or at least significantly reduced. This may have positive influence on the adherence between the components, in particular of the outer layers of the preform building element and/or on the maximum thickness of preform building elements that can be manufactured.

In embodiments, the method for manufacturing the preform building element has the additional advantage that no further heat sources, for instance an oven, a heatable mold or the like, are required, so that the footprint of the used devices in a facility can be reduced. In addition, by manufacturing the preform building elements by laying out the fiber mat components one after the other, considerably thicker preform building elements may be manufactured than by using an oven or a heatable mold since the elements no longer have to be heated from the outside in order to obtain a desired core temperature. In addition, also longer preform building elements may be fabricated since there is no need for a subsequent arrangement in an oven.

In embodiments, the heating time will be constant as it depends solely on the number of fiber mat components used for manufacturing the preform building element. As a further advantage, the manufacturing method is not limited to a different type of mold and can be used on molds with fixed molding surfaces and/or on molds with replaceable molding surfaces as well.

The application of the binding agent to the boundary has the advantage that the fiber mat components must not be pre-impregnated with a binding agent, so that in particular the same fiber glass mats can be used as for the resin-based casting of the wind turbine rotor blade. This may significantly reduce the material costs for the manufacturing process. Furthermore, the binding agent may be arranged on the subjacent component according to the individual preform building element to be manufactured and its requirements, in particular with regard to the amount and/or pattern of the applied binding agent.

In embodiments, the individual laying out of the fiber mat components and their individual adherence to the at least one adjacent component enables a continuous quality check whether the attachment meets the desired requirements. This leads to a higher quality of the binding and therefore also to higher quality results of the entire manufacturing method. Furthermore, embodiments of the invention has the advantage that the laying out of the fiber mat components may be automized at least partly for further facilitating the manufacturing of the preform building element.

In an embodiment, the further component is or comprises a fiber mat and/or a solid core component. Hence, also the further component may be a fiber mat component, which is arranged at first in the molding surface. In addition or alternatively, the further component may also be a solid core component, for instance a core component consisting of balsa wood, a polymer foam, or any other polymer and/or foam material. This allows for instance to attach the laid-out fiber mat components to a rigid core component, which is initially arranged in the mold.

In an embodiment, the one or more fiber mat components are provided from a fiber mat storage means, wherein the fiber mat storage means is moved along at least a section of the molding surface during laying out of the or each fiber mat component. The fiber mat storage means may be coupled for instance to a gantry or to a portal support, which may be movable along the molding surface in at least one direction. For instance, the storage means and/or a support structure carrying the storage means may form a movable member that is movable for instance on wheels and/or on rails in the floor in the vicinity of the mold.

In addition or alternatively to a storage means movable on the floor in the surroundings of the mold, also a suspended storage means hanging for instance from an overhead crane may be used. Also, the hanging storage means may be movable along the preform mold for laying out of the fiber mat component. A suspended storage means has the advantage that it can be flexibly moved from one mold to another to allow for manufacturing a plurality of preform building elements in different molds.

The mold used for manufacturing the preform building element may have a rectangular shape, wherein the molding surface is convexly or concavely curved along the shorter axis of the rectangular shape. The storage means can be moved for instance along the longer, straight edge of the molding surface supplying the fiber mat component to the molding surface allowing for continuously laying down the fiber component onto the previously arranged components.

The storage means may be supported in such manner that for instance the distance, or the height, respectively, to the molding surface can be adjusted. This allows for arranging easily a plurality of fiber mat components stacked onto each other on the molding surface and therefore to manufacture preform building elements with a comparatively large thickness. Furthermore, also the position of each fiber mat component to be laid down with respect to the molding surface may be adjusted.

In an embodiment, the fiber mat storage means is a roller, wherein the one or more fiber mat components are laid out by unrolling from the roller. The rotational axis of the roller may be for instance arranged along the concave or convex edge of the molding surface and hence in the chord-wise direction of a preform building element to be manufactured.

The different fiber mat components may be manufactured from a continuous, large fiber mat stored on the roller by cutting off the fiber mat components once they have been laid out as desired. By cutting the long fiber mat, a new fiber mat component is created, which can then be placed on top of the previously arranged fiber mat component. Alternatively, one or more fiber mat components may be arranged on the storage means.

In an embodiment, the binding agent is applied to the moving boundary by arranging a liquid or solid binding agent on the subjacent component in front of the moving boundary. In this respect, the term “in front” refers to the movement action of the boundary, so that the binding agent is applied to the upper surface of the underlying component before it comes into contact with the laid-out fiber mat component arranged from above.

The binding agent may be liquid or solid and it may be applied continuously while the boundary is moving. In addition or alternatively, also a sectional distribution of the binding agent is possible, wherein the binding agent is distributed discontinuously, for instance as dots, and/or only in a part of the section along the moving direction of the boundary, or the laying down direction of the fiber mat component, respectively.

In an embodiment, the binding agent is applied by at least one binding agent application means, in particular a spray dispenser, a liquid dispenser, a hot-melt dispenser or a solid adhesive dispenser, wherein the binding agent application means is moved along at least a section of the molding surface during laying out of the or each fiber mat component. The application means may be arranged at the same movable member as the storage means. Alternatively, separate movable members may be used.

The binding agent may be sprayed for instance in liquid form, and/or as solid particles. Also, an application of the binding agent in an at least partly liquified form or as liquid using a liquid dispenser and/or a holt-melt dispenser is possible. For instance, a liquid or softened binding agent may be applied for example in strips or in other patterns, such as lines, curves, circles, dashes, dots and/or in any combination thereof. Also, an application in streaks may occur, wherein the streaks have the advantage that they may act afterwards as ribs that prevent wrinkles in the preform building element and may facilitate the further arrangement of the preform building element in a manufacturing procedure of a wind turbine rotor blade.

When using spray application and/or the application of liquid binding agents, for instance in strips or other shapes, it is possible to precisely control the areas, in which the binding agent material is applied. Thereby, also binding agent-free sections on top of the subjacent component and therefore also in between the subjacent component and the fiber mat component arranged above can be established.

For example, it is possible that for towards the edges of the components, or of the preform building element to be manufactured, respectively, an overlap area to another preform building element is created when placed in the blade mold. Therefore, it might be desired to have a loose bond between the two preform building elements when they are placed in the blade mold so that no binding agent is applied in the edge areas and/or between the fiber mat component and subjacent component in an edge section of the rotor blade facilitating an arrangement and/or alignment of the preform building elements in the blade mold.

Correspondingly, it is also possible to add more binding agent in some regions to increase the strength of the preform building element to be manufactured. This might be beneficial for instance near lifting points of the building element, to facilitate the lifting of the preform building element from the molding surface after the manufacturing and/or the transport of the preform building element for storage and/or arrangement in the blade mold.

As a solid adhesive dispenser, for instance a roller with a solid binding agent, for instance in form of a film, a net, or a mesh, may be used. For application, this binding agent may be unspooled from the roller and arranged between the subjacent component and the fiber mat component to be laid out.

In an embodiment, the applied binding agent and/or the supplied binding agent is activated using at least one activation means, wherein the activation means is moved along at least a section of the molding surface during and/or after laying out of the or each fiber mat component. The activation means may be arranged at the same movable member as the storage means. Alternatively, separate movable members may be used.

By moving the activation means along the molding surface, the binding agent at the moving boundary can be activated so that the laid-out fiber mat component can be adhered to the subjacent component directly at the boundary. By activating the binding agent only at the boundary, or only in the vicinity of the boundary, respectively, an immediate adherence of the fiber mat component on the subjacent component can be obtained, wherein in other regions, no binding occurs, since either no binding agent has been applied or an applied and/or supplied binding agent is not activated in a larger distance in front of the moving boundary.

In an embodiment, as activation means, a heat source radiating and/or blowing heat to the binding agent, a light source shining light on the binding agent, an activation chemical dispenser and/or a heatable guiding roller arrangement guiding the fiber mat component to be laid out in front of the boundary is used. The type of the activation means may correspond to the type of the binding agent used for application and/or to the type of binding agent which is supplied in the laid-out fiber mat components and/or in the subjacent component for activation.

The activation means may apply heat, visible light, IR light and/or UV light, and/or an activation chemical as catalyzer to the binding agent to activate its binding properties. As an alternative, also a heat source blowing hot air or another hot gas onto the fiber mat component, the further component and/or the boundary may be used. In embodiments, the activation means is arranged in such manner that there is sufficient time for the applied binding agent and/or the supplied binding agent after activation, hence after contact with the heat, the light and/or the chemicals, to obtain its binding properties before the laid-out fiber mat component is placed in direct contact with the binding agent at the boundary.

In an embodiment, a pressure is applied to the boundary and/or to a contact area section behind the moving boundary. By the application of the pressure, the laid-out fiber mat component is pressed onto the respective subjacent component arranged underneath the laid-out fiber mat component so that a tight and in particular wrinkle-free attachment of the components may occur. The pressure may be applied for instance with a sufficient duration and/or to a sufficient contact area section to allow for hardening of the activated binding agent and/or for any other reaction causing the adherence between the components to finish.

In an embodiment, the pressure is applied by at least one pressuring means, which is moved along at least a section of the molding surface during and/or after laying out the or each of the fiber mat components. The pressuring means may be for instance arranged on the same movable member as a fiber mat storage means, a binding agent application means and/or an activation means, so that in embodiments only one movable member has to be moved along at least a section of the molding surface. Alternatively, one or more of the aforementioned means may be arranged on separate movable members so that they are movable separately from each other along at least a section of the molding surface.

As pressuring means, a flexible pressuring means adaptable to the shape of the molding surface and/or the components arranged of the molding surface, in particular a flexible pressuring roller, a flexible pressuring cover, a flexible pressuring pillow, and/or a pressuring air stream, is used. By providing a flexible pressuring means for pressing the laid-out fiber mat onto the subjacent component, an adaption of the pressuring means to the shape of the molding surface and/or the shape of the arranged components, which may both vary other the length and/or the width of the mold, becomes possible. This allows for instance to apply a continuous pressure onto the components when the pressuring means travels along the mold in a lengthwise direction. Furthermore, it enables to use the pressuring means and/or a movable member carrying the pressuring means on different molds and/or on molds with exchangeable molding surfaces.

A flexible pressuring roller may be made for instance of a soft, but heavy material to press the laid-out fiber mat component onto the underlying components. The roller may comprise a large, flexible roll or a plurality of smaller rolls or wheels running adjacently to each other. This allows for adapting to the shape of the preform building element to be fabricated. The pressuring roller may be moved or rolled along the stack of components behind the boundary so that it applies a pressure to the boundary and/or to a contact area section behind the boundary.

The pressuring means may be a flexible pressuring cover, for instance heavy belt or cover of a flexible material that is placed above the components in the mold. The flexible pressuring cover may be moved by lifting it locally at the position of a movable member, so that the fiber mat component to be laid down can be arranged on the subjacent component and a binding agent can be applied and/or activated in the vicinity of the boundary.

A flexible pressuring pillow may be filled with a flexible, but heavy material or substance, for instance with water. The length of the flexible pillow may be adjustable and/or pillows with different lengths may be used, so that their weight and/or the length and therefore the time in which pressure is applied to the laid-out fiber mat component can be adjusted. Also, the movement speed in which the pressuring means and/or a storage means, a binding agent application means, and/or an activation means are moved along the molding surface may be adapted in dependence on the required pressuring time, to ensure that sufficient pressure is applied for a sufficient time onto the laid-out fiber mat component to allow for instance a hardening of the binding agent. The flexible pressuring pillow may be manufactured from a flexible material and may comprise a smooth material on its underside to avoid damage to the fiber mat components.

In addition or alternatively, also a pressuring air stream can be used to locally apply a pressure onto the laid-out fiber mat component. In addition, this air stream could be used to heat or cool the contact area section, to which the pressure is applied when a heat-activated binding agent is used.

In an embodiment, a pressuring means comprising a tempering means is used, wherein the laid-out fiber mat component and/or the subjacent component are heated and/or cooled during the application of the pressure. The heating may occur for instance to activate an inactivated binding agent and/or a binding agent supplied in the laid-out fiber mat component and/or in the subjacent component, in particular when no other activation means are used. By using a heated pressuring means, both pressure and heat can be applied if this is required for the activation of the use binding agent.

Alternatively, a cooling of the pressuring means may occur so that for instance a binding agent activated by heat may be cooled, in particular to enable solidification of the binding agent or the like for adhering the fiber mat component to the at least one subjacent component. By application of an active cooling of the binding agent, the time which the binding agent requires to harden, can be decreased, so that also the speed of the lay out-process and hence of the boundary may be faster than without active cooling.

As tempering means, for instance a liquid or gas circulating inside the pressuring means, in particular inside a flexible pressuring roller, a flexible pressuring cover and/or a flexible pressuring pillow, may be tempered by an external tempering means connected to the pressuring means. The fluid may circulate in fluid channels inside the pressuring means to apply and/or remove heat from the laid-out fiber mat component and/or one or more subjacent components.

A mold arrangement for manufacturing of a preform building element used for building a wind turbine rotor blade according to embodiments of the invention comprises a mold with a molding surface and at least one movable member, wherein the movable member is movable along at least a section of the molding surface and comprises at least one fiber mat storage means for storing one or more fiber mat components and for laying out the one mor more fiber mat components on the molding surface.

In an embodiment, the movable member comprises at least one binding agent application means, at least one binding agent activation means and/or at least one pressuring means.

In an embodiment, the movable member comprises a frame structure, which is movable along at least one guiding structure of the mold arrangement, and/or the guiding structures may be for instance rails and/or a movable hoist that allows for moving the movable member along at least a section of the molding surface.

All details and advantages described in relation to the method for manufacturing a preform building element according to embodiments of the invention apply correspondingly to the mold arrangement according to embodiments of the invention and vice versa.

BRIEF DESCRIPTION

Figure 2:
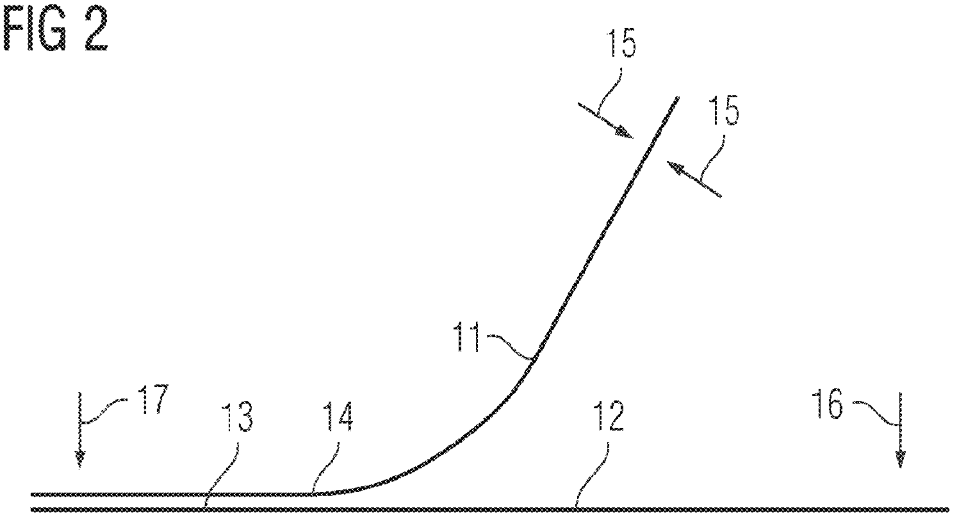
Figure 3:
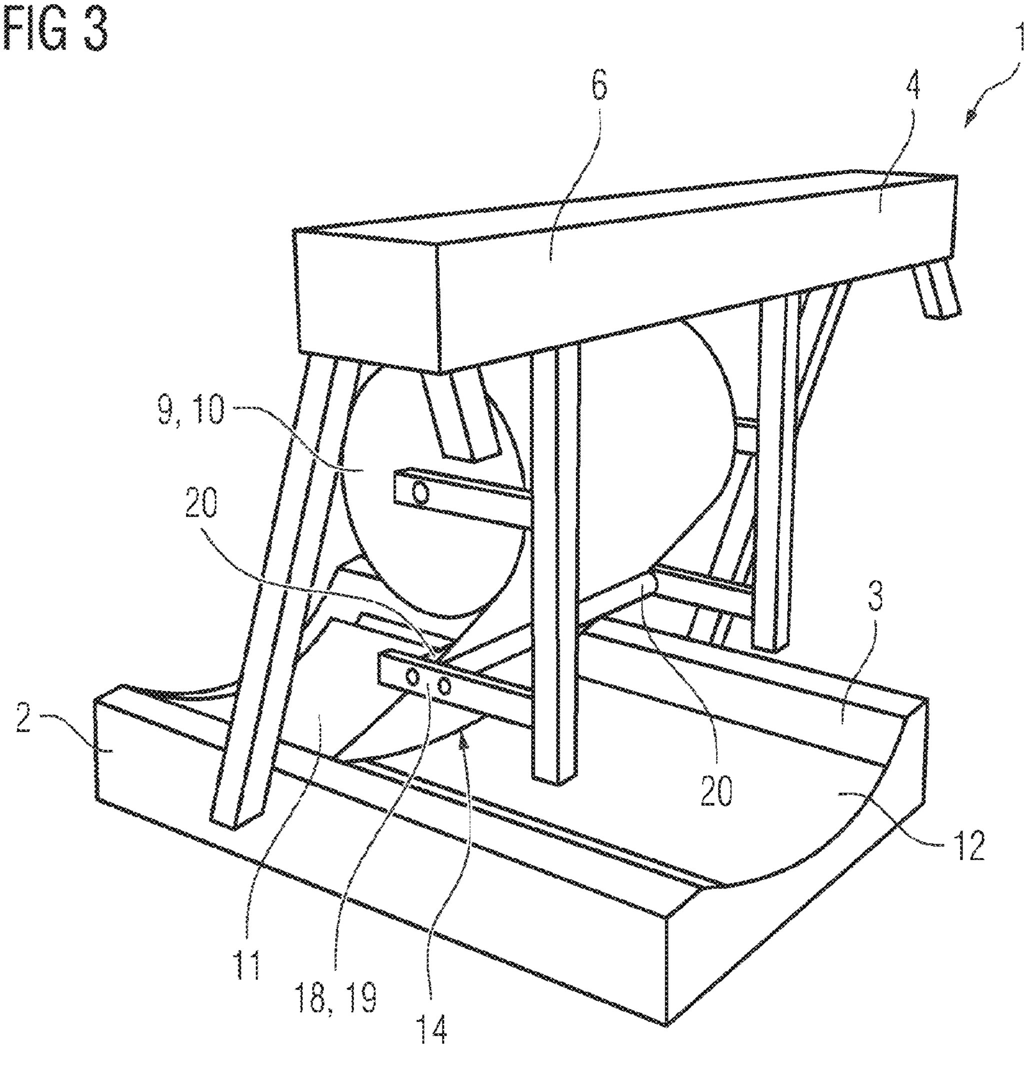
Figure 4:
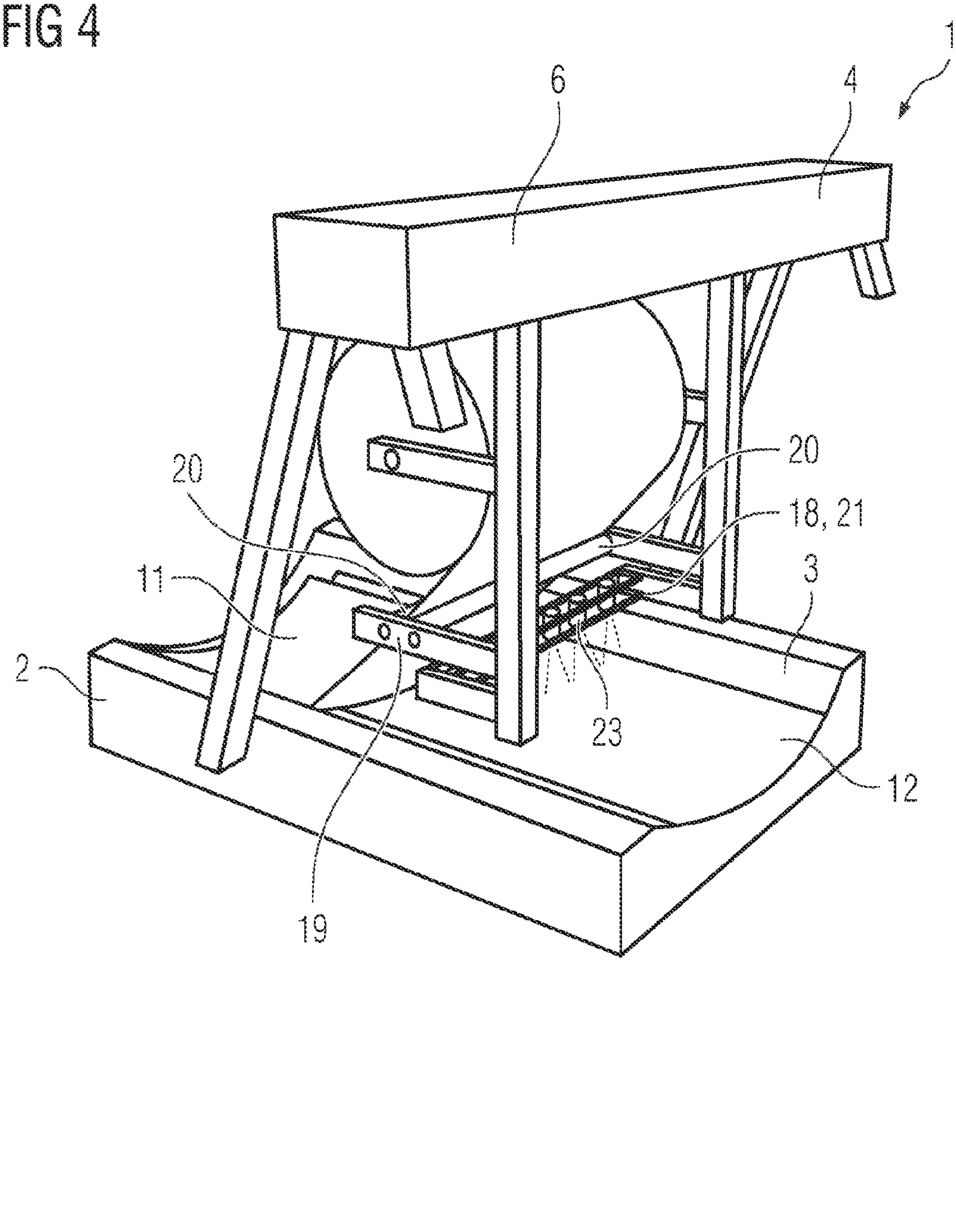
Figure 5:
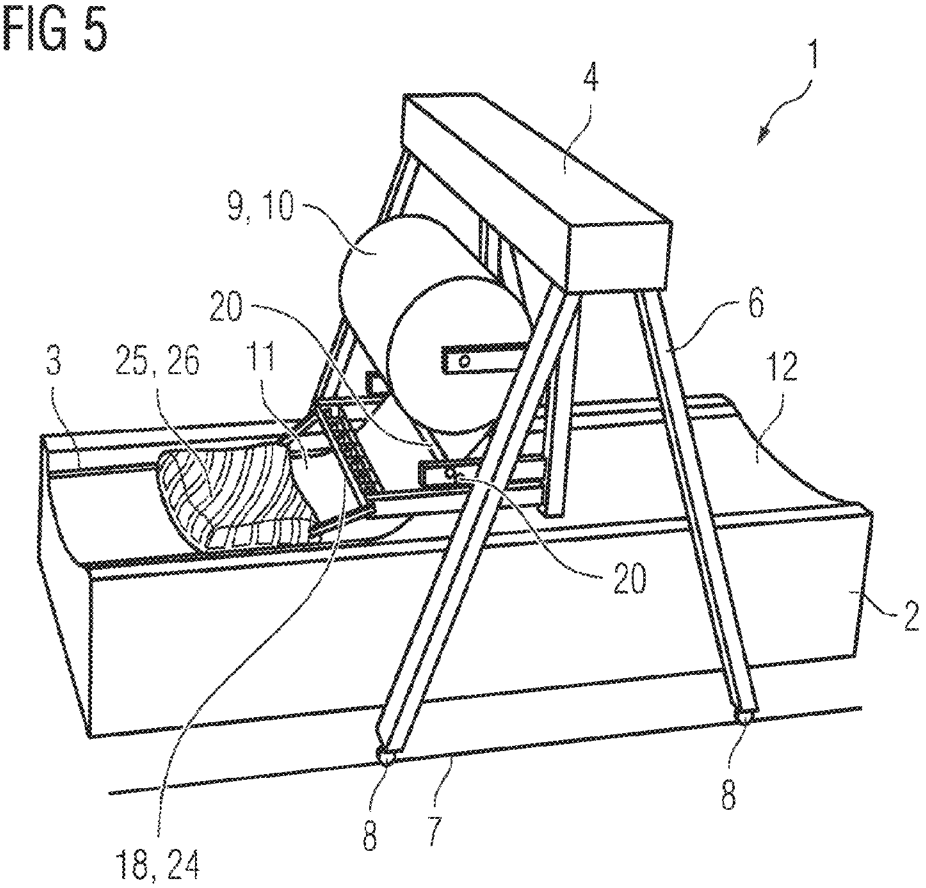
Figure 6:
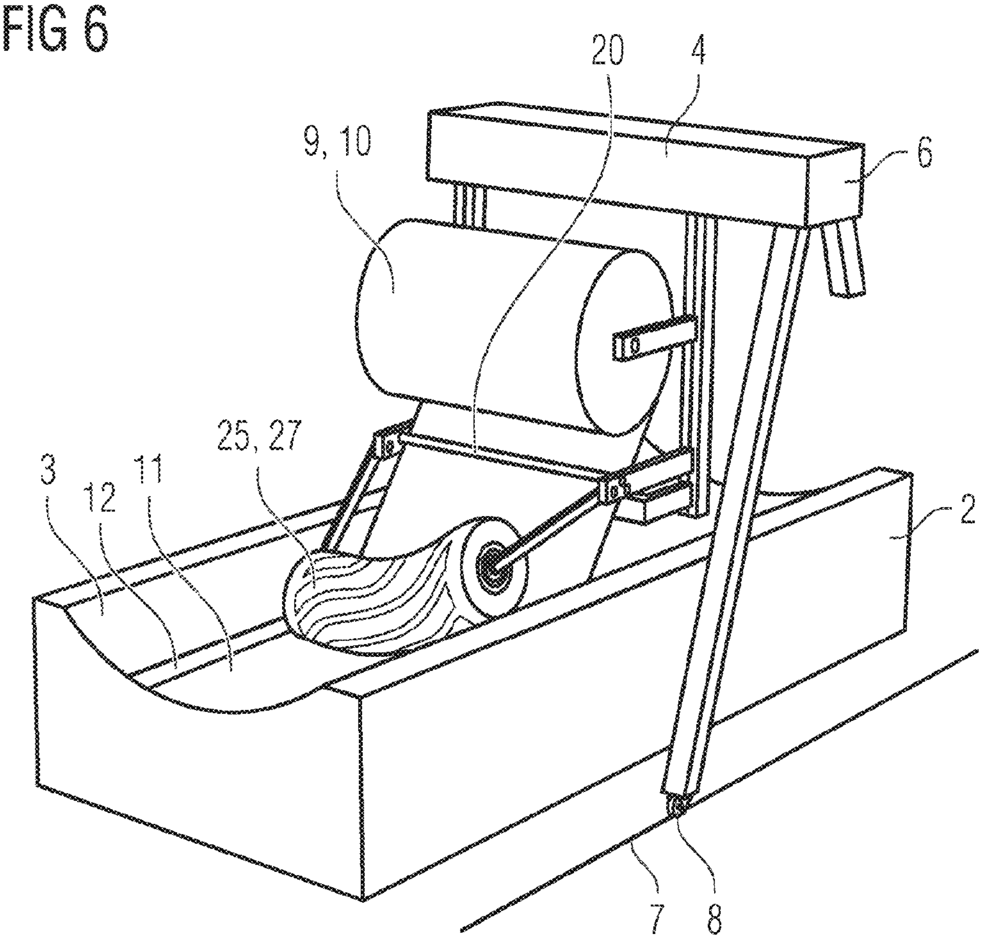
Figure 7:
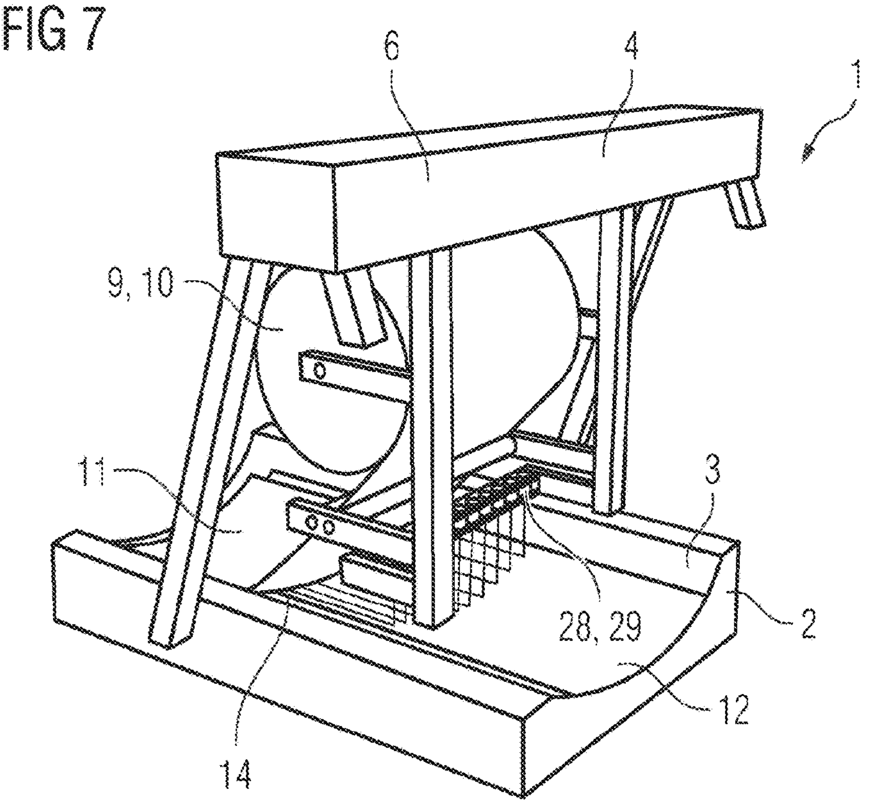

Some of the embodiments will be described in detail, with references to the following Figures, wherein like designations denote like members, wherein:

FIG. 1 a first embodiment of a mold arrangement suitable for conducting an embodiment of a method for manufacturing a preform building element;

FIG. 2 a schematic of a fiber mat component that is laid out onto a further component;

FIG. 3 a first embodiment of a binding agent application means for a mold arrangement;

FIG. 4 a second embodiment of a binding agent application means for a mold arrangement;

FIG. 5 a third embodiment of a binding agent application means for a mold arrangement and a first embodiment of a pressuring means;

FIG. 6 a second embodiment of a pressuring means for a mold arrangement;

FIG. 7 a first embodiment of a binding agent application means; and

Figure 8:
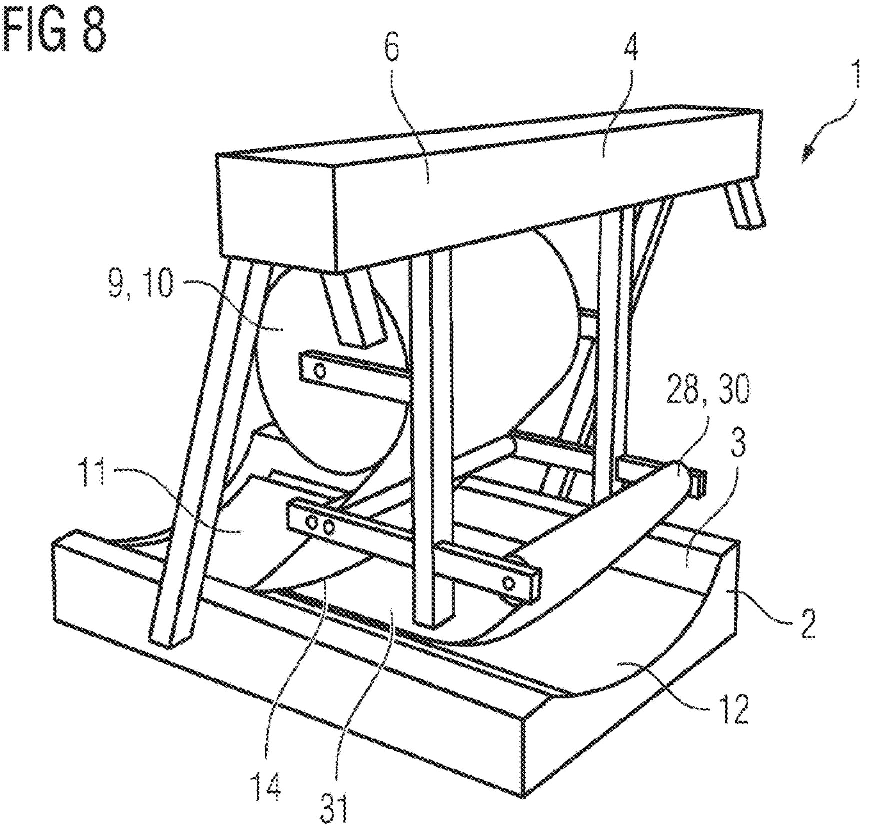

FIG. 8 a second embodiment of a binding agent application means.

DETAILED DESCRIPTION

In FIG. 1, an embodiment of a mold arrangement 1 for manufacturing a preform building element used for building a wind turbine rotor blade is shown. The mold arrangement 1 comprises a mold 2 with a molding surface 3 and at least one movable member 4. The movable member 4 is movable along at least a section of the molding surface 3 as indicated by the arrows 5.

The movable member 4 comprises a frame structure 6, which is movable along at least one guiding structure 7 of the mold arrangement 1. In this embodiment, the guiding structures 7 are rails, on which wheels 8 of the frame structure 6 are moving. This allows for guiding the movable member 4 along the entire molding surface 3, or at least along a section of the molding surface 3, respectively.

On the frame structure 6, a fiber mat storage means 9 is arranged, wherein the frame structure 6 forms a portal support for the storage means 9. The fiber mat storage means 9 is therefore movable along at least a section of the molding surface 3 by moving the movable member 4. The fiber mat storage means 9 is a roller 10, wherein one or more fiber mats 11 are arranged on the roller 10.

As indicated by the arrows 22, the frame structure 6 may be adaptable to carry fiber mat storage means 9 of different widths, so that the frame structure 9 may be used for the manufacturing of differently shaped preform building elements, and/or to adapt the position of the laid-out fiber mat component 11 with respect to the width of the mold 2 during the laying down in length direction of the mold 2.

Furthermore, a height in which the fiber mat storage means 9 is arranged above the molding surface 3 may be adapted so that the storage means 9 may be lifted after one or more fiber mat components 11 has been arranged on the molding surface 3. The movable member 4 and/or the frame structure 6 may be automized so that the manufacturing can be conducted automatically or at least semi-automatically.

The mold arrangement 1 may be used in a method for manufacturing a preform building element used for building a wind turbine rotor blade. The preform building element is manufactured from one or more fiber mat components 11 and at least one further component 12. The further component 12 is arranged initially on the molding surface 3 of the mold 2.

The further component 12 may be or comprise a fiber mat and/or a solid core component, like a panel made of balsa wood and/or a foam material. In this embodiment, also the further component 12 is a fiber mat component. The fiber mat component 11, which is supplied from the storage means 9, is arranged on top of the further component 12.

The fiber mat component 11 is laid out at least sectionally on the further component 12, which is directly subjacent to the laid-out fiber mat component 11. For laying out the fiber mat component 11, the movable member 4 may be moved continuously or step-by-step along the molding surface 3, while the fiber mat component 11 to be laid out is unspooled from the roller 10 used as storage means 9.

In FIG. 2, the cross-sectional view of the fiber mat component 11 and the further component 12 is shown. As can be seen, a contact area 13 between the fiber mat component 11 and the further component 12 is formed during laying out the fiber mat component 11 on the further component 12. The contact area 13 has a boundary 14, which moves along the molding surface 3 when the fiber mat component 11 is laid out on the further component 12. The fiber mat component 11 is moved by moving the storage means 9, or the movable member 4, respectively, along the molding surface 3, so that the boundary 14 moves correspondingly to the movable member 4.

After laying out the first fiber mat component 11, it is possible that one or more additional fiber mat components 11 are laid out. In this case, the previously laid out fiber mat component 11 forms the subjacent component, onto which the next fiber mat component is arranged. Therefore, the movable member 4 can be moved back to a start position to deposit the further layer along the molding surface 3 in the same direction as the previously laid out fiber mat component 11.

Alternatively, a further movable member may be used which arranges the further fiber mat component onto a previously laid-out fiber mat component 11, in particular before the previously fiber mat component 11 has been laid out entirely on the respective subjacent component.

During laying out of the fiber mat component 11, a binding agent is applied at least sectionally to the boundary layer and/or a binding agent supplied in the laid-out fiber mat component 11 and/or in the subjacent component 12 is activated at least sectionally at and/or behind the boundary 14. The applied binding agent and/or the activated supplied binding agent adheres the laid-out fiber mat component 11 to the subjacent component, for instance the further component 12 as depicted.

A binding agent applied at least sectionally to the boundary 14 and/or a binding agent supplied in the laid-out fiber mat component 11 and/or in the respective subjacent component may be activated at the boundary 14 for instance by heat application to the laid-out fiber mat component 11, the further component 12 and/or directly to the binding agent prior, during and/or after its arrangement. As it is indicated by the arrows 15, the heat may be applied for instance to a section of the fiber mat component 11 to be laid out, which has not yet been laid down into direct contact with the subjacent further component 12. Hence, the heat is applied as indicated by the arrows 15 to a section of the fiber mat component 11 close to the boundary 14, which will be laid out on the further component 12 subsequently due to the movement of the boundary 14.

In addition or alternatively, a heat application may also occur at the position indicated by the arrow 16, hence in front of the moving boundary 14 and/or, as indicated by the arrow 17, at an area behind the boundary 14 and therefore at least to a section of the contact area 13 between the fiber mat component 11 and the further component 12, or any other subjacent component, respectively.

In FIG. 3, a first embodiment of an activation means 18 is shown. The activation means 18 is also attached to the frame structure 6 of the movable member 4, so that it is movable along at least a section of the molding surface 3 during laying out of the fiber mat component 11. In this embodiment, the activation means 18 is a heatable guiding roller arrangement 19, which guides the fiber mat component 11 to be laid out in front of the boundary 14 and hence enables a heating of the fiber mat component 11 to be laid down in front of the boundary 14, correspondingly to the position marked by the arrow 15 in FIG. 2.

The guiding roller arrangement 19 comprises two guiding rollers 20 for guiding and/or pulling the fiber mat component 11 between the roller 10, from which it is unspooled, and the boundary 14, on which it is deposited onto the further component 12. By the heatable guiding roller arrangement 19, the fiber mat component 11 is heated, so that for instance a binding agent, which is integrated in the fiber mat component 11, is activated. By the heating of the fiber mat component 11, additionally or alternatively, also a binding agent arranged in the further component 12 may be activated due to the increased temperature of the fiber mat component 11 at the boundary 14, or at the contact area 13 in the vicinity of the boundary 14, respectively.

In FIG. 4 a further embodiment of an activation means 18 is shown. The second embodiment of the activation means 18 may be used together with the first embodiment of the activation means 18, namely the heatable guiding roller arrangement 19, as it is depicted in FIG. 4. Alternatively, a roller arrangement comprising two rollers 20, which are not heatable, may be used or the guiding roller arrangement 19 may be omitted.

The second embodiment of the activation means 18 is a heat source 21 adapted for radiating heat onto the further component 12, or a previously laid out fiber mat component 11, respectively. In this embodiment, the heat source comprises a plurality of lamps 23, which shine visible light, invisible light, laser light or any other electro-magnetic radiation, onto the further component 12 at a position in front of the boundary 14 corresponding to the arrow 16 shown in FIG. 2. This heats up the further component 12 and/or a binding agent supplied in the further component 12, so that the binding agent in the further component 12 and/or any other binding agent present at the boundary 14 may be activated. In the contact area 13, the activated binding agent is adhered to the fiber mat component 11, which is laid out on the further component 12 as previously described. As an alternative, also a heat source blowing hot air or another hot gas onto the fiber mat component 11, the further component 12 and/or the boundary may be used.

Alternatively, the activation means 18 may be an activation chemical dispenser which sprays an activation chemical, for instance a catalyst, onto the further component 12. The application of the activation chemical may cause an activation of a binding agent supplied in the further component 12 and/or any other binding agent present at the boundary 14.

In FIG. 5, a third embodiment of an activation means 18 is shown. In this embodiment, the activation means 18 is a heat source 24, which radiates heat onto the fiber mat component 11 in the contact area 13, in which it is laying on the further component 12 arranged underneath the fiber mat component 11 in the mold 2. The heat radiation may occur as described for the heat source 21 in relation to FIG. 3.

In addition, the movable member 4 comprises a pressuring means 25, which is realized as a flexible pressuring pillow 26. Also, the pressuring means 25 is attached to the movable member 4, so it is moved along at least a section of the molding surface 3 during laying out of the fiber mat components 11. The pressuring means 25 applies a pressure to the contact area 13 to improve the adhesive connection between the fiber mat component 11 and the further component 12.

The pressuring means 25 may comprise a tempering means (not shown), which allows for heating and/or cooling the pressuring means 25. For instance, the flexible pressuring pillow 26 may be fillable with a fluid, for instance water, from an external tempering unit, so that cooled and/or heated water can be supplied to the pressuring means 25.

By supplying a heated fluid to the flexible pressuring pillow 26, for instance the activation means 18 may be omitted so that the temperature from the pressuring means 25 may also be used for activating the binding agent at the boundary 14 and/or in a section of the contact area 13. The pillow 26 may be filled with a tempered fluid prior to the manufacturing of the preform building element, or it may be connected to the tempering unit by one or more connecting means like tubes or hoses to allow for continuous resupply and/or exchange of the fluid.

By providing a cooling using the pressure means 25, for instance a solidification of a binding agent, which has been activated by heat, can be accelerated, so that faster processing times can be achieved. By adapting the length of the pillow 26 in a direction of the movement of the movable member 4, the duration of the pressure application to the contact areas 13 can be adjusted. Furthermore, by different thicknesses of the pillow 26, the weight of the pillow 26 can be adjusted so that different pressures can be applied, depending on the type of the preform building element to be manufactured.

In FIG. 6, a second embodiment of a pressuring means 25 is shown. The pressuring means 25 is provided as a flexible pressuring roller 27. The flexible pressuring roller 27 may consist for instance of a soft, but heavy material, which presses the laid-out fiber mat 11 onto the further component 12. As previously described, also the flexible pressuring roller 27 may comprise a tempering means for heating and/or cooling of the fiber mat component 11 and/or of the binding agent at the contact area 13 and/or the boundary 14. The tempering means may be or comprise for instance one or more fluid ducts, which may be connected to an external heating and/or cooling device for providing a heated and/or cooled fluid to the flexible pressuring roller 27, in particular correspondingly to the flexible pressuring pillow 26.

In addition or alternatively to the flexible pressuring pillow 26 and the flexible pressuring roller 27, also a flexing pressuring cover (not shown) may be used as pressuring means 25. The flexible pressuring cover may for instance be a heavy belt or cover of a flexible material that is placed above the components on the molding surface 3. The flexible pressuring cover may be lifted locally at the position of a movable member 4, so that the fiber mat component 11 to be laid down can be arranged on the subjacent component and/or a binding agent can be applied and/or activated in the vicinity of the boundary. A further possibility is the usage of a pressuring air stream which blows a pressuring air stream onto the fiber mat component 11 in a section of the contact area 13.

In addition or alternatively to the usage of a binding agent already supplied in the fiber mat component 11 and/or the further component 12, also an application of a binding agent to the boundary 14 during the laying out of the fiber mat component 11, or during the movement of the movable member 4, respectively, is possible.

In FIG. 7, a first embodiment of a binding agent application means 28 is shown. In this embodiment, the application means 28 is a hot-melt-dispenser 29, which disposes a liquid binding agent onto the upper surface of the further component 12 in front of the moving boundary 14 as a continuous or discontinuous stream through a nozzle. Alternatively, also a spray dispenser may be used for distributing a liquid binding agent in front of the boundary 14. The hot-melt dispenser 29 may heat a solid binding agent to liquefy it prior to dispensing. Another possibility is to use a solid adhesive dispenser, which is adapted to provide a solid binding agent for instance in granular form or the like to the boundary 14, or onto the surface of the further component 12, or any other subjacent component, respectively. Furthermore, also a liquid dispenser dispensing an initially liquid binding agent may be used as binding agent application means 28.

The binding agent may be distributed in different patterns, depending for instance on the nozzles of the corresponding dispenser and/or on the movability of the nozzles relative to the stationary further component 12. A liquid binding agent may be for instance arranged in stripes, in zigzag-patterns, as dots and/or in any other continuous and/or discontinuous pattern.

A binding agent distributed in stripes in the length direction of the molding surface may form supporting ribs stabilizing the preform building element to be manufactured, in particular along its spanwise direction. In addition or alternatively, by applying a zig-zag pattern or the like, also the stability in the width direction of the molding surface 3, or in the chordwise direction of the preform building element to be manufactured, respectively, may be enhanced.

In FIG. 8, a second embodiment of a binding agent application means 28 is shown. In this embodiment, the binding agent application means 28 is a solid adhesive dispenser 30, from which a solid binding agent is provided in form of a continuous adhesive sheet 31. The adhesive sheet 31 is arranged between the upper surface of the further component 12 and the lower surface of the laid-down fiber mat component 11. The adhesive sheet may consist of the material used as binding agent and it may be a continuous sheet, a mesh structure, a net structure and/or a plurality of stripes.

Independently on the type of the binding agent application means 28 that is used, one or more of the aforementioned activation means 18 may be used for activation of the binding agent. Besides the continuous adhesive sheet 31, also other sheets, for instance mesh structures, a plurality of stripes or the like, may be used.

In embodiments, it is possible that the fiber mat storage means 9, the binding agent application means 28 and/or the at least one activation means 18 are arranged on the same movable member 4. Alternatively, these means may also be moved on two or more movable members 4, so that they may be moved independently on each other, if this is required. Furthermore, the aforementioned means may be combined in any possible combination on one or more movable members 4 in an embodiment of a mold arrangement 1 and/or in an embodiment of the method.

By using a plurality of movable members 4, it is also possible to arrange the fiber mat component 11 entirely on the further component and/or on a previously laid-out fiber mat using a first movable member, wherein the binding agent is only applied at least sectionally to the boundary during laying out the fiber mat component 11. The activation of the binding agent may then occur afterwards, when the fiber mat component 11 and the binding agent have been arranged using an activation means 18 and/or a pressuring means 25 arranged on at least a second movable member.

A plurality of fiber mat components 11 laid into the mold 2 may be created for instance by cutting them from a continuous fiber mat stored on the storage means 9 once the end of the molding surface 3 has been reached by the moving boundary 14. An additional fiber mat component 11 may then be placed on the subsequently placed fiber mat component 11 by moving the movable member 4 to a starting position on the opposing side of the end position and to begin the laying out of the next fiber mat component 11. In this case, the subjacent component is the previously laid out fiber layer 11. By doing so, a plurality of further fiber mat components 11 may be arranged on the molding surface 3 forming preform building elements of arbitrary thicknesses. In embodiments, since the fiber mat components 11 are adhered individually to the respective subjacent components, the time required for heating only scales linearly with the number of fiber mat components 11 arranged in the mold 2.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for manufacturing a preform building element configured for building a wind turbine rotor blade, wherein the preform building element is manufactured from one or more fiber mat components and at least one further component, wherein the at least one further component is arranged on a molding surface of a mold, wherein the one or more fiber mat components are arranged one after the other on the at least one further component and/or on previously arranged fiber mat components, wherein each fiber mat component is laid out at least sectionally on the respective directly subjacent component with a moving boundary of a contact area, at which the laid out fiber mat comes into contact with the subjacent component, wherein during laying out of each fiber mat component, a binding agent is applied at least sectionally to the moving boundary and/or a binding agent supplied in the laid-out fiber mat component and/or in the subjacent component is activated at least sectionally at and/or behind the moving boundary;

wherein the applied binding agent and/or the activated supplied binding agent adheres the laid-out fiber mat component to the subjacent component.

2. The method according to claim 1, wherein the at least one further component is or comprises a fiber mat and/or a solid core component.

3. The method according to claim 1, wherein the one or more fiber mat components are provided from a fiber mat storage means, wherein the fiber mat storage means is moved along at least a section of the molding surface during laying out of each fiber mat component.

4. The method according to claim 3, wherein the fiber mat storage means is a roller, wherein the one or more fiber mat components are laid out by unrolling from the roller.

5. The method according to claim 1, the binding agent is applied to the moving boundary by arranging a liquid or solid binding agent on the subjacent component in front of the moving boundary.

6. The method according to claim 5, wherein the binding agent is applied by at least one binding agent application means, including a spray dispenser, a liquid dispenser, a hot-melt dispenser or a solid adhesive dispenser, wherein the binding agent application means is moved along at least a section of the molding surface during laying out of each fiber mat component.

7. The method according to claim 1, wherein the applied binding agent and/or the supplied binding agent is activated using at least one activation means, wherein the activation means is moved along at least a section of the molding surface during and/or after laying out of each fiber mat component.

8. A hod according to claim 7, wherein as activation means a heat source radiating heat to the binding agent, an activation chemical dispenser and/or a heatable guiding roller arrangement guiding the fiber mat component to be laid out in front of the moving boundary is used.

9. The method according to claim 1, wherein a pressure is applied to the moving boundary and/or to a section of the contact area behind the moving boundary.

10. The method according to claim 9, wherein the pressure is applied by at least one pressuring means, which is moved along at least a section of the molding surface during and/or after unrolling of the of each of the fiber mat components.

11. The method according to claim 10, wherein as pressuring means, a flexible pressuring means adaptable to a shape of the molding surface and/or the components arranged of the molding surface, a flexible pressuring roller, a flexible pressuring cover, a flexible pressuring pillow, and/or a pressuring air stream, is used.

12. The method according to claim 10, wherein a pressuring means comprising a tempering means is used, wherein the laid-out fiber mat component and/or the subjacent component are heated and/or cooled during the application of the pressure.

* * * * *